United States Patent
Staffans et al.

(10) Patent No.: US 9,501,183 B2
(45) Date of Patent: Nov. 22, 2016

(54) METHOD, APPARATUS AND COMPUTER PROGRAM PRODUCT FOR DISTINGUISHING A TOUCH EVENT FROM A GESTURE

(71) Applicant: Nokia Technologies Oy, Espoo (FI)

(72) Inventors: Tommy Sven Ingvald Staffans, Espoo (FI); Albert Sadovnikov, Espoo (FI); André Moacyr Dolenc, Espoo (FI)

(73) Assignee: Nokia Technologies Oy, Espoo (FI)

( * ) Notice: Subject to any disclaimer, the term of this patent is extended or adjusted under 35 U.S.C. 154(b) by 47 days.

(21) Appl. No.: 14/093,970

(22) Filed: Dec. 2, 2013

(65) Prior Publication Data

US 2015/0153866 A1    Jun. 4, 2015

(51) Int. Cl.
*G06F 3/044* (2006.01)
*G06F 3/041* (2006.01)

(52) U.S. Cl.
CPC ............. *G06F 3/044* (2013.01); *G06F 3/0416* (2013.01); *G06F 2203/04108* (2013.01)

(58) Field of Classification Search
None
See application file for complete search history.

(56) References Cited

U.S. PATENT DOCUMENTS

| | | | | |
|---|---|---|---|---|
| 2003/0174149 | A1* | 9/2003 | Fujisaki | G06F 3/04883 345/684 |
| 2007/0152976 | A1* | 7/2007 | Townsend | G06F 3/0416 345/173 |
| 2008/0046425 | A1* | 2/2008 | Perski | G06F 3/04883 |
| 2009/0315740 | A1* | 12/2009 | Hildreth | G06F 3/017 341/20 |
| 2012/0169646 | A1* | 7/2012 | Berkes et al. | 345/174 |
| 2013/0215034 | A1* | 8/2013 | Oh et al. | 345/173 |

OTHER PUBLICATIONS

"How Can I Prevent the Clicked() Signal from Being Emitted When I Want to Grab the Double Clicked() Signal in My Item View?", Qt Project, Retrieved on Feb. 25, 2014, Webpage available at : http://qt-project.org/faq/answer/how_can_i_prevent_the_clicked_signal_from_being_emitted_when_i_want_to_grab.

"Button Messages", Microsoft, Retrieved on Feb. 25, 2014, Webpage available at : http://msdn.microsoft.com/en-us/library/windows/desktop/bb775941%28v=vs.85%29.aspx.

* cited by examiner

*Primary Examiner* — Ryan A Lubit
(74) *Attorney, Agent, or Firm* — Alston & Bird LLP (57) ABSTRACT

There are disclosed a method, apparatuses and a computer program product for sensing a movement of an object in proximity of a sensing panel. In some embodiments of the method proximity data indicative of existence of one or more pointing objects in proximity of a sensing panel is formed. It is also determined from the proximity data whether at least one of the pointing objects touches the sensing panel. If the determining indicates at least one touch of at least one pointing object, it is determined if a probability that movement of one or more of the pointing objects in proximity of the sensing panel illustrates a predetermined gesture. The probability is compared to a predetermined threshold; and a touch event is sent, if the probability is less than the predetermined threshold.

22 Claims, 5 Drawing Sheets

METHOD, APPARATUS AND COMPUTER PROGRAM PRODUCT FOR DISTINGUISHING A TOUCH EVENT FROM A GESTURE

TECHNICAL FIELD

The present invention relates to a method comprising sensing a movement of an object in proximity of a sensing panel, to an apparatus comprising a sensing panel, and a computer program product for sensing a movement of an object in proximity of a sensing panel.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Many apparatuses use a sensing panel or a corresponding element for receiving user interactions. Such sensing panels may be located on a display of the apparatus so that the display may be used to provide the user some information, selection options etc. The user may then use her/his finger, a stylus or another object detectable by the sensing panel to interact with the apparatus, such as selecting an option on the screen, inputting text, selecting an icon to start execution of a program, etc. The combination of the display and the sensing panel above the display may also be called as a touch screen.

SUMMARY

Various embodiments provide a method and apparatus for sensing a movement of an object in proximity of a sensing panel and determining whether a touch on the touch screen is intentional or unintentional. In some embodiments information regarding the sensed movements is used to evaluate a probability that the movements are meant to express a gesture or a touch.

Various aspects of examples of the invention are provided in the detailed description.

According to a first aspect, there is provided a method comprising:

forming proximity data indicative of existence of one or more pointing objects in proximity of a sensing panel;

determining from the proximity data to determine whether at least one of the pointing objects touches the sensing panel;

if the determining indicates at least one touch of at least one pointing object, determining a probability that movement of one or more of the pointing objects in proximity of the sensing panel illustrates a predetermined gesture; and comparing the probability to a predetermined threshold; and triggering a touch event, if the probability is less than the predetermined threshold.

According to a second aspect there is provided an apparatus comprising at least one processor and at least one memory including computer program code, the at least one memory and the computer program code configured to, with the at least one processor, cause the apparatus to:

form proximity data indicative of existence of one or more pointing objects in proximity of a sensing panel;

determine from the proximity data to determine whether at least one of the pointing objects touches the sensing panel;

if the determining indicates at least one touch of at least one pointing object, to determine a probability that movement of one or more of the pointing objects in proximity of the sensing panel illustrates a predetermined gesture;

compare the probability to a predetermined threshold; and trigger a touch event, if the probability is less than the predetermined threshold.

According to a third aspect, there is provided a computer program product including one or more sequences of one or more instructions which, when executed by one or more processors, cause an apparatus to at least perform the following:

form proximity data indicative of existence of one or more pointing objects in proximity of a sensing panel;

determine from the proximity data to determine whether at least one of the pointing objects touches the sensing panel;

if the determining indicates at least one touch of at least one pointing object, to determine a probability that movement of one or more of the pointing objects in proximity of the sensing panel illustrates a predetermined gesture;

compare the probability to a predetermined threshold; and trigger a touch event, if the probability is less than the predetermined threshold.

According to a fourth aspect, there is provided an apparatus comprising:

a sensing panel to form proximity data indicative of existence of one or more pointing objects in proximity of the sensing panel;

a determining element to determine from the proximity data whether at least one of the pointing objects touches the sensing panel;

an analyzing element adapted to determine a probability that movement of one or more of the pointing objects in proximity of the sensing panel illustrates a predetermined gesture, if the determining indicates at least one touch of at least one pointing object; wherein the analyzing element is further adapted to compare the probability to a predetermined threshold; and trigger a touch event, if the probability is less than the predetermined threshold.

Some example embodiments are defined in the dependent claims.

Separation between swiping and touching may be an issue to be addressed in many systems, such as but not limited to, mobile communication devices and other devices using electric energy. A user may not always manage to swipe a gesture above a sensing panel of a device without accidentally touching the sensing panel. Therefore, separating gesture drawing from intentional touches may be a good method to increase the use experience of the device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 2:
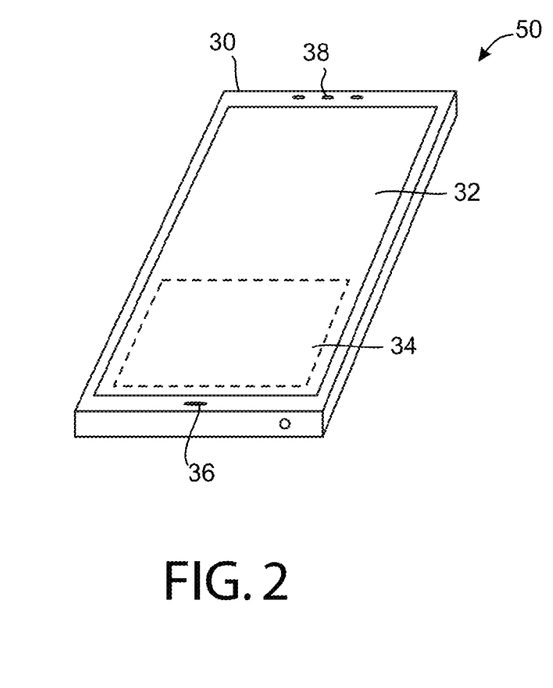
FIG. 2 shows an apparatus according to an example embodiment.
Figure 4:
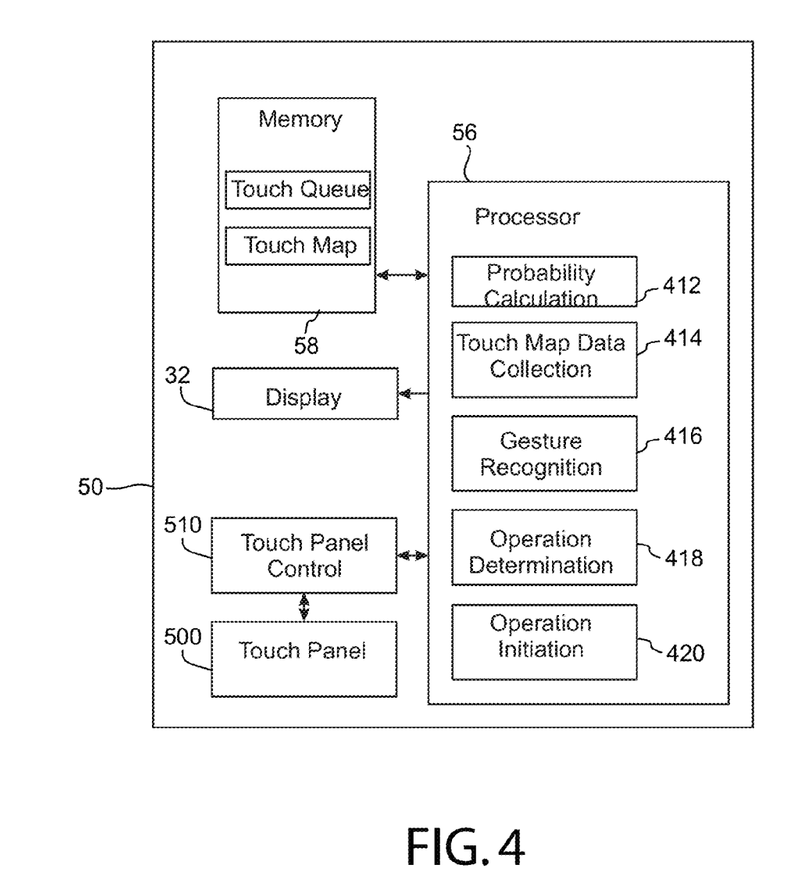
FIG. 4 shows a simplified block diagram of an apparatus according to an example embodiment.
Figure 5:
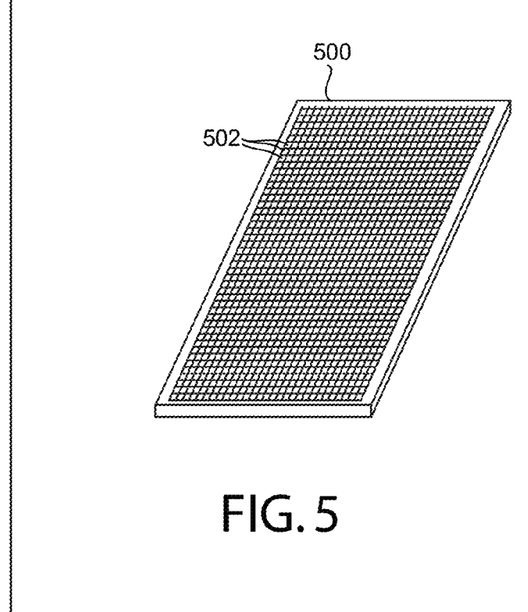
FIG. 5 shows in a simplified manner an example of a sensing panel comprising a matrix of sensing areas.

FIG. 5 shows in a simplified manner an example of a sensing panel, and FIGS. 2 and 4 depict an example of an apparatus comprising the sensing panel. A surface area of a sensing panel 500 may comprise a matrix of sensing areas 502. A controller 510 of the sensing panel may examine which sensing area(s) is/are being touched, if any. Thus, the sensing panel controller 510 may determine the location of the touch by recognizing the area or areas of the matrix in which a property of the sensing area has changed due to a touch or due to an electrically conducting object near or on the surface of the sensing area. Thus, an apparatus receiving information from the sensing panel 500 may be able to detect coordinates of the touch at certain accuracy on the basis of information provided by the sensing panel controller 510.

It should be noted here that in practical implementations the number of sensing areas 502 may be different from what is depicted in FIG. 5. In many sensing panels the number of sensing areas 502 is larger than what is depicted in FIG. 5.

Figure 6:
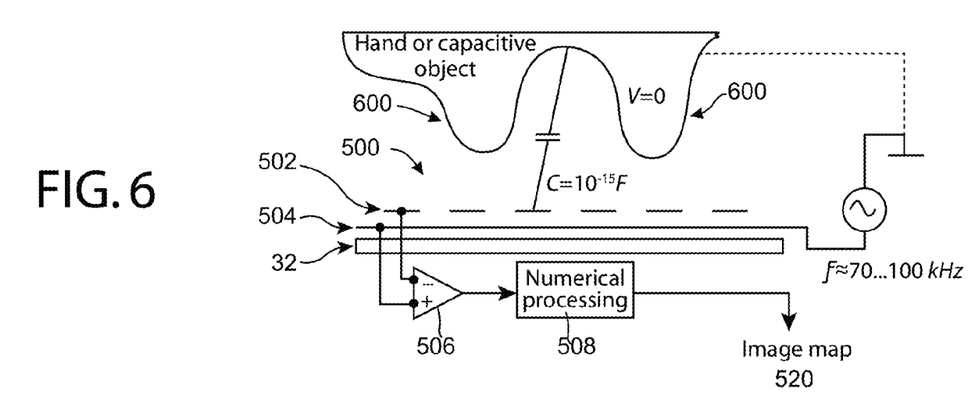
FIG. 6 illustrates an example principle of sensing a pointing object in proximity of the sensing panel.

Many sensing panels which are in use are based on capacitive technology. Such sensing panels may detect changes in a charge on one or more sensing areas on the surface of the sensing panel. When the user touches the sensing panel by a finger or by a stylus, the user's hand may cause that the charge of the sensing area is partly or totally discharged via the person to a ground. This change in the charge may be determined e.g. by examining the voltage level of the sensing area. The voltage level may be used to decide whether the user's finger or another pointing object has actually touched the sensing panel or is near the surface of the sensing panel without touching it or is not detected at all i.e. is farther away from the surface of the sensing panel. Hence, such sensing panels are also able to detect changes in the charge when the finger/stylus is near the surface of the sensing panel but does not touch the surface of the sensing panel. This information may be used to determine the distance of the pointing object from the surface of the sensing panel. FIG. 6 illustrates an example principle of sensing a pointing object in proximity of the sensing panel.

The operation of the sensing panel 500 may be controlled by a sensing panel controller 510 or another controlling element. A simplified example is depicted in FIG. 6. The sensing panel controller 510 (not shown in FIG. 6) may control the circuitry of the sensing panel to provide an AC voltage as a driving signal to a guard electrode 504 of the sensing panel 500, or this voltage may always be present when the sensing panel is operating. Reading of the charge of the sensing areas may be performed e.g. by a charge amplifier 506 which measures the voltage difference between the guard electrode 504 and the sensing area 502 and outputs a signal relative to the voltage difference. Each sensing area 502 may be provided with the charge amplifier 506 or one charge amplifier 506 may be used to measure the voltage difference of more than one sensing area 502. In the latter case the measurement of the sensing areas 502 may not be performed simultaneously but sequentially.

Figure 7A:
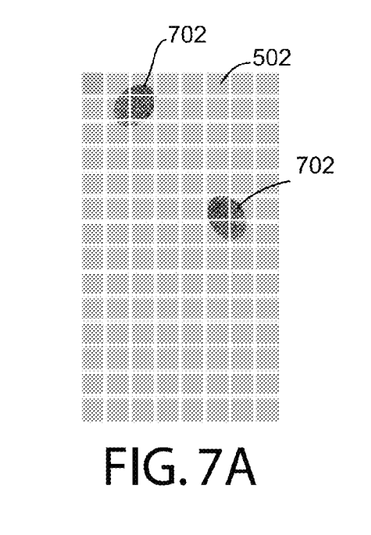
FIG. 7a depicts an example of example of sensing two pointing objects near the sensing panel.
Figure 7B:
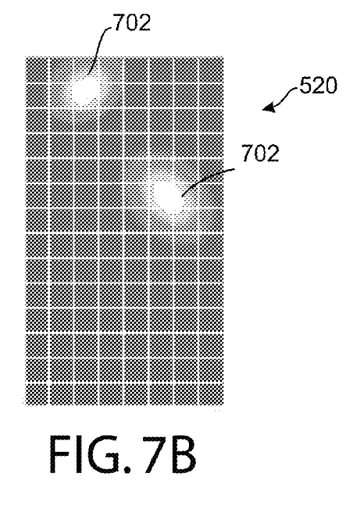
FIG. 7b depicts an example of a corresponding vicinity map.

The signal provided by one or more charge amplifiers 506 may be analyzed e.g. by an analyzer 508 to determine whether there is an object which touches one or more of the sensing areas 502 or is near any of the sensing areas 502. This information may be used to construct a proximity map 520 in which each element represents one sensing area 502 and the value of the element indicates if the sensing area is touched or if the pointing object is near the sensing area 502 or if no pointing objects are detected. This information may also be called as proximity information. An example of sensing two pointing objects such as fingers 600 near the sensing panel is depicted in FIG. 7a and an example of a corresponding proximity map 520 is depicted in FIG. 7b. The squares in FIG. 7a illustrate the sensing areas and in FIG. 7b the darkness of the squares illustrates the proximity information. In this example, the lighter is the color of the square the nearer is the pointing object of the sensing area 502. In the example of FIGS. 7a and 7b there are two areas 702 in which a pointing object has been detected in the proximity of the sensing panel. These pointing objects may, for example, be fingers of the user of the apparatus.

The proximity map may be examined by a controller 56 of the apparatus or another element of the apparatus to determine the location(s) of the touch(es). Then, the controller may determine if the touch(es) should initiate some operation(s) in the apparatus. For example, a set of icons may be displayed on the display 32 of the apparatus and if the touch has been detected at the location of one of such icons, the controller may start to perform tasks defined for this icon.

There may also be operations in which the user is not assumed to actually touch the sensing panel but e.g. swipe or hover his hand above the sensing panel 500 and this will initiate one or more operations on the apparatus. For example, the user may swipe her/his hand over the sensing panel from one edge to the opposite edge to switch a screen saver off, to take a snapshot of the information currently shown on the display, etc. However, such air swiping or hovering without touching the sensing panel may not be easily performed wherein the user may unintentionally touch the sensing panel during swiping/hovering. Hence, the apparatus might interpret the touching so that the user actually wanted to touch the sensing panel at the detected touching point, which may cause that the apparatus starts to perform some operation which the user did not want to happen.

In some embodiments of the present invention a detection of a touch is not directly interpreted as a real touch but it is examined whether the intention of the user was to touch the sensing panel or not. This may be performed e.g. by determining the probability (block 412 in FIG. 4) that the user is actually performing the air swipe or hovering operation. For example, coordinates and proximity data of the latest detected proximity of the pointing object and one or more previously detected proximities of the pointing object, which may have been stored into a memory e.g. as a queue, may be used as parameters of a probabilistic model. The coordinate and proximity data may be retrieved from the memory, for example, to be used by the probabilistic model. Running the probabilistic model may produce a probability value which indicates how probable it is that the detected proximity of the pointing object actually was meant to be air swipe/hovering operation or actual touch. The determination of the touch may be delayed for a while and if it is determined that the user is or was actually performing air swipe or hovering, the touch may be discarded.

For simplicity, a certain set of possible states may be defined regarding the detection of touch/proximity of a pointing object. In some embodiments three different states may be used: touching, in proximity, and farther away. The state touching means that a touch on the surface of the sensing panel 500 has actually been detected at a certain location. The state proximity means that a pointing object has been detected near the surface of the sensing panel at a certain location but not touching the sensing panel. The distance in which the sensing panel may detect the pointing object may vary. For example, in some embodiments the maximum distance between the sensing panel and the pointing object in which the sensing panel detects the presence of the pointing object may be about 5 cm, but in some other embodiments the distance may be greater or less than 5 cm. The maximum distance may also vary in different situations and with different persons. For example, humidity, use of cloves and the material of gloves etc. may affect the maximum distance. The state farther away means that no pointing object has been detected by the sensing panel at a certain location. In other words, this may mean that the distance between the sensing panel and the pointing object may be greater than the above mentioned maximum distance, e.g. greater than 5 cm. Hence, each element of the proximity map could contain a value which represents one of these three states. In some other embodiments there may be more than three different possible states.

In the following some example embodiments of the determination of whether the user is performing the air swipe or touching the sensing panel are described in more detail. Although this description mentions that the sensing panel controller 510 provides information on the detected objects e.g. in the form of a proximity map (block 414) and that the controller of the apparatus performs further analyzes on the basis of the proximity map information, in some other embodiments there may be other elements which take care of touch detection and/or analyzes of the touch information.

The touch controller 510 sequentially controls the circuitry of the sensing panel 500 so that the correct voltages are coupled to the guard electrode 504 and detected charges are read from the electrodes of the sensing area by the charge amplifier(s) and provided to the analyzer 508 to form the proximity map. The sensing panel controller 510 may sequentially provide the proximity map to the controller of the apparatus. In some embodiments the whole proximity map may be provided whereas in some other embodiments information on only such elements of the proximity map is provided to the controller of the apparatus in which there is a change in the value of the element. The change in the value may indicate that the position of the pointing object have changed with respect to the location of the sensing area (approached or drawn away from the sensing panel). A touch may be detected by the controller e.g. on the basis that the state of an element in the proximity map changes to touching.

The controller of the apparatus may keep track of the detected locations of the sensing panel 500 e.g. by storing the coordinates of locations in which the state in the proximity map indicates proximity. The coordinates of those locations may be used to determine the gesture the pointing object is forming while it moves above the sensing panel (block 416). For example, the controller of the apparatus may examine if the location of the detected pointing object changes between consecutive proximity detections and if so, the controller may assume that the user is performing air swiping above or at the surface of the sensing panel.

If an indication of the touch occurs, the controller may use e.g. a probabilistic model to determine the probability that the user is performing air swiping on the sensing panel. Some non-limiting examples of such probabilistic models are Hidden Markov Models (HMM) and Conditional Random Fields (CRF). The coordinates of the previously detected proximity locations may be input to the probabilistic model which outputs the probability value that there is an air swipe going on. This probability value may be compared to a threshold and if the comparison reveals that the probability is greater than or equal to the threshold, the controller may wait before deciding whether to process the touch or not. Processing the touch may mean different operations in different situations. It may, for example, mean that a message or an event is generated in the system to be further processed by one or more applications running in the system. As an example, the event may be receiving a selection by the user wherein information of the selection may then be provided to an application which was requesting the selection. During the waiting period the controller may receive further information from the sensing panel controller which may be input to the probabilistic model wherein a new probability value may be calculated.

If the controller determines during the waiting period that it is very probable that the user is drawing a certain gesture, the controller may begin to perform operations relating to the gesture and may ignore the processing of the detected touch (blocks 418 and 420).

If, on the other hand, the probability value drops below the threshold, the controller may decide that the user was not drawing a gesture and the touch was intentional. Hence, operations regarding the touch may be initiated.

It may also happen that, for some reason, the controller is not able to make the decision within the waiting period. Hence, if the waiting period expires the controller may discard the touch or initiate operations relating to the touch, or in some embodiments the controller may lengthen the waiting period until a further time limit expires.

In some situations there may be more than one detected touch when the user is swiping the pointing object above the sensing panel. These touches may be queued until the decision between drawing the gesture or intentionally touching the sensing panel may be made. The queued information may contain coordinates of the detected touches, for example, or if several neighboring sensing areas indicate a touch, an average or a center of mass of the coordinates of the touched areas may be calculated and stored into the queue to represent one touch. If the controller decides that the touch was intentional, the controller may use information of one touch (e.g. the latest one) or more than one touch in the queue in further processing.

The length of the waiting period may be different in different embodiments and in different situations. To give some non-limiting examples, the waiting period may be few milliseconds such as 10, 15, 20, 25 or 30 milliseconds or even longer than that. The threshold value may also differ in different embodiments. For example, in devices in which the sensing panel is less sensitive to proximity detections i.e. the user needs to move the pointing object nearer the surface of the sensing panel compared to devices having more sensitive sensing panels, the threshold for the detection of swiping/ hovering may be lower. The threshold value may also depend on the information shown on the display. For example, if a keyboard is shown on the display it may be more probable that the user intents to touch the sensing panel rather than hover over the sensing panel.

Figure 8:
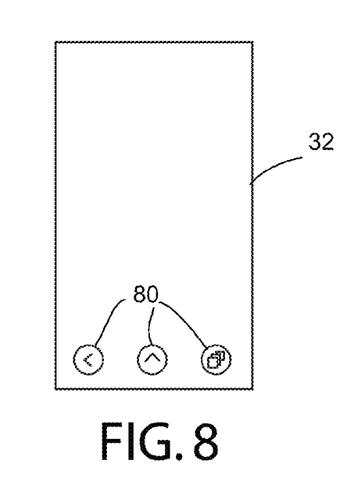
FIG. 8 depicts an example of specific virtual buttons on a display.

In some embodiments one or more areas of the touch screen may be handled differently. For example, certain areas may be excluded from the touching operation but which are usable with the swiping operation. For example, there may be relatively narrow areas near the edges of the sensing panel in which detections of touches are discarded. There may also be areas which are excluded from the swiping operation. For example, there may be provided one or more virtual buttons or other selection element(s) on the display area which may have a higher priority and those button(s) may react to a touch irrespective of the swiping operation. FIG. 8 depicts an example of displayed information having such virtual buttons 80. Hence, if a touch is detected at such locations it may be assumed that the touch was intentional, or it may be examined how long the touch lasts at such area and if the touch lasts more than a predetermined period it may be decided that the touch is intentional. Such areas may be a virtual keyboard area, or any special user interface element, such as back/home/ search buttons in a mobile phone.

It should be noted here that the terms "air swipe", "swipe" and "hover" do not necessarily mean a liner or curvilinear motion over the sensing panel but may also mean other kinds of gestures the user may form by the pointing object. As an example, the user may draw a circle or a square above the surface of the sensing panel, wherein if an unintentional touch occurs during drawing, the above described principles may be applied to determine whether the touch was intentional or unintentional.

Figure 9:
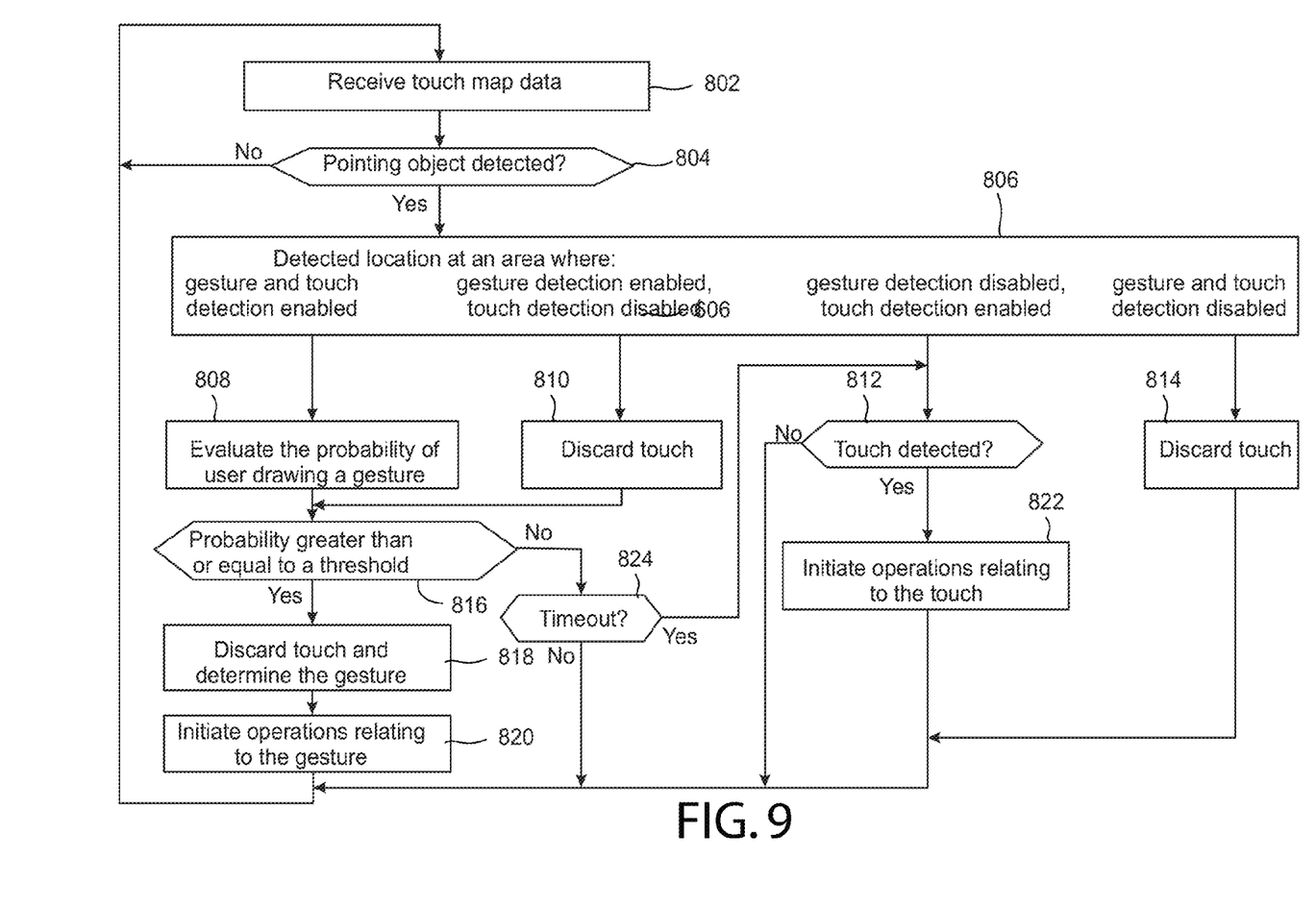
FIG. 9 depicts a simplified flow diagram of an example embodiment of a method.

FIG. 9 depicts as a simplified flow diagram a method according to an example embodiment. In block 802 information from the sensing panel controller 510 is received regarding the proximity map. In block 804 the proximity map information is examined to determine whether a pointing object is detected in the proximity of the sensing panel. If so, in block 806 it is further examined whether the location of the detected pointing object is in an area in which both gesture detection and touch detection are enabled wherein the method moves to block 808, or in an area in which gesture detection is enabled and touch detection is disabled wherein the method moves to block 810, or in an area in which gesture detection is disabled and touch detection is enabled wherein the method moves to block 812, or in an area in which both gesture detection and touch detection are disabled wherein the method moves to block 814.

In block 808 the current proximity map information and previously received proximity map information are used to evaluate the probability that the user is drawing a gesture above the sensing panel. If the probability is above or equal to the threshold (block 816) the touch information which may have been queued is discarded and the operation moves to step 818 to find out which gesture has been drawn and perform tasks relating to the determined gesture (block 820).

If the probability is below the threshold a timeout may be examined to determine whether the touch (if any) should now be handled or not (block 824).

In block 810 possible touch detections are discarded and the operation continues from block 816.

In block 812 the current proximity map information is examined to determine if a touch has been detected. If so, in block 822 it is examined which operations may be initiated due to the touch.

In block 814 the touch information is discarded because both gesture detection and touch detection are disabled at the location where the pointing object has been detected.

The operations(s) which may be initiated due to the touch may vary in different embodiments and in different situations. In some embodiments the touch may initiate triggering a touch event. The touch event may mean an indication to an operating system that an incident has occurred and is waiting for processing. The processing may include calling an event handler program which may determine the type of the event and what operations should be performed due to the incident. In connection with sensing panels the operations may include starting to execute a program, interpreting a pressing of a virtual button (push button event), etc.

Some non-limiting examples of touch related events are a Tap event, when one finger touches the screen and lifts up, a Press and hold event, when one finger touches the sensing panel and stays in place for a while; a Slide event, when one or more fingers touch the sensing panel and move in the same direction; a Swipe event, when one or more fingers touch the sensing panel and move a short distance in the same direction; a Pinch event, when two or more fingers touch the sensing panel and move closer together or farther apart; a Rotate event, when two or more fingers touch the sensing panel and move in a clockwise or counter-clockwise arc; and a Stretch event, when two or more fingers touch the sensing panel and move farther apart.

Many of the above operations may be performed by different means. For example, the computer program of the apparatus may include different pieces of program code to perform different operations of the methods described above. In some embodiments some of the operations may also be performed by circuitry dedicated to such operations.

In the following some examples of use cases are provided in which an unintentional touching may be discarded or provided for further processing. For example a user of the device may be scrolling the information shown on the display by swiping her/his hand over the sensing panel e.g. upwards (scrolling down) or downwards (scrolling up). Proximity data are formed and stored in the queue. The user may accidentally touch the sensing panel which may be detected as a touch, but the device may perform examining the proximity data and determine that no touch event shall be generated in this situation and the touch shall be ignored. In another example the user is again scrolling by swiping and when s/he notices an object in the information shown on the display stops swiping and touches the sensing panel for a while (e.g. longer than a predetermined waiting period). In this case the device may deduce that the touching was intentional and triggers a touch event for further processing. The object may, for example, be a link to a web page wherein the further processing may include starting a browser application (if not already running) and sending the link data to the browser application which then may download the web page. In a yet another example the user may zoom in/zoom out information shown on the display e.g. by rotating her/his finger slightly above the surface of the sensing panel and may accidentally touch the sensing panel during the rotation gesture. The device may deduce that the touching was unintentional and ignores the touch.

The following describes in further detail suitable apparatus and possible mechanisms for implementing the embodiments of the invention. In this regard reference is first made to FIG. 1 which shows a schematic block diagram of an exemplary apparatus or electronic device 50 depicted in FIG. 2, which may incorporate a receiver front end according to an embodiment of the invention.

Figure 1:
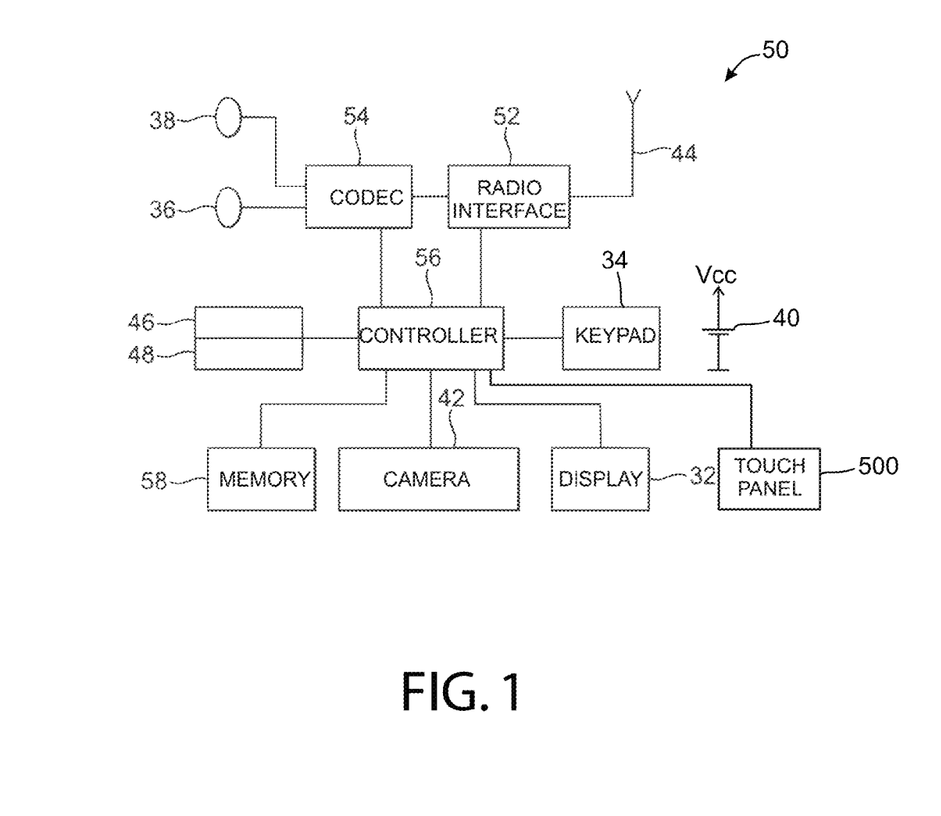
FIG. 1 shows a block diagram of an apparatus according to an example embodiment.

The electronic device 50 may for example be a mobile terminal or user equipment of a wireless communication system. However, it would be appreciated that embodiments of the invention may be implemented within any electronic device or apparatus which may require reception of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 102 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting imaging.

Figure 3:
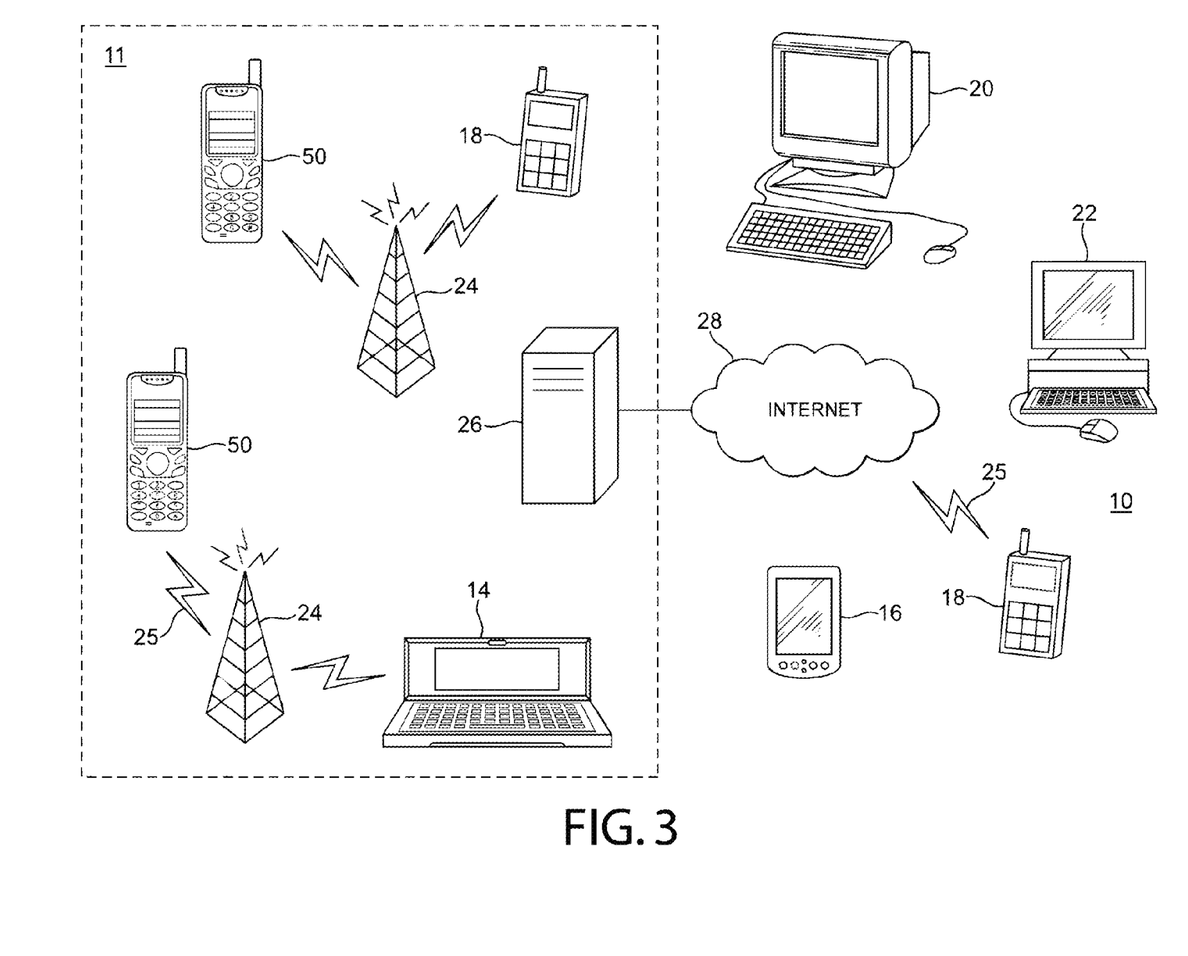
FIG. 3 shows an example of an arrangement for wireless communication comprising a plurality of apparatuses, networks and network elements.

With respect to FIG. 3, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport e.g. as an in-car entertainment system (ICE) or a navigator.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which sensing panels are used to receive user interaction. Thus, for example, embodiments of the invention may be implemented in a portable camera, a GPS receiver, a TV, a desktop computer, a set-top box, a copying machine, medical devices, mp3 player etc.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer program code executable by a data processor of the device, such as in the processor entity, or by hardware, or by a combination of computer program code and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

forming proximity data indicative of existence of one or more pointing objects in proximity of a sensing panel;

examining the proximity data to determine whether at least one of the pointing objects has touched the sensing panel;

if the determining indicates at least one touch of at least one pointing object, determining a probability that movement of one or more of the pointing objects in proximity of the sensing panel illustrates a predetermined gesture;

comparing the probability to a predetermined threshold; and triggering a touch event, if the probability is less than the predetermined threshold.

In some embodiments of the method said forming proximity data comprises:

receiving one or more signals from the sensing panel;

converting said one or more signals to a first coordinate value, a second coordinate value and a proximity value representing said proximity data; and storing the first coordinate value, the second coordinate value and the proximity value.

In some embodiments the method comprises collecting proximity data from multiple time instants, wherein the proximity data comprises one or more data tables including coordinates on the sensing panel and proximity values regarding the coordinates.

In some embodiments of the method the proximity value indicates one of the following:

the pointing object touches the sensing panel at the coordinate location; the pointing object is not touching the sensing panel but is in the proximity of the coordinate location;

the pointing object is not detected in the proximity of the coordinate location.

In some embodiments the method comprises:

if the proximity value indicates that the pointing object touches the sensing panel, examining if the location indicated by the coordinates is excluded from swiping operation; and triggering the touch event if the location indicated by the coordinates is excluded from swiping operation.

In some embodiments the method comprises:

storing data of a multiple of detected touches in a queue, wherein the method further comprises one or more of the following:

ignoring each detected touch in the queue;

ignoring all but the newest detected touch in the queue;

triggering the touch event of one or more detected touches in the queue.

In some embodiments the method comprises using one of the following models to determine the probability:

Hidden Markov Model;

Conditional Random Fields.

In some embodiments the method comprises:

sending the touch event to an application for processing.

According to a second example there is provided an apparatus comprising at least one processor and at least one memory including computer program code, the at least one memory and the computer program code configured to, with the at least one processor, cause the apparatus to:

form proximity data indicative of existence of one or more pointing objects in proximity of a sensing panel;

determine from the proximity data whether at least one of the pointing objects touches the sensing panel;

if the determining indicates at least one touch of at least one pointing object, to determine a probability that movement of one or more of the pointing objects in proximity of the sensing panel illustrates a predetermined gesture;

compare the probability to a predetermined threshold; and trigger a touch event, if the probability is less than the predetermined threshold.

In some embodiments of the apparatus said at least one memory and computer program code configured to, with the at least one processor, cause the apparatus to:

receive signals from the sensing panel;

convert said signals to a set of first coordinate values, second coordinate values and proximity values representing said proximity data;

store the first coordinate values, the second coordinate values and the proximity values; and form one or more data tables from the proximity data.

In some embodiments of the apparatus said at least one memory and computer program code configured to, with the at least one processor, cause the apparatus to:

examine if the location indicated by the coordinates is excluded from swiping operation, if the proximity value indicates that the pointing object touches the sensing panel; and trigger a touch event if the location indicated by the coordinates is excluded from swiping operation.

In some embodiments of the apparatus said at least one memory and computer program code configured to, with the at least one processor, cause the apparatus to:

store data of a multiple of detected touches in a queue, wherein said at least one memory and computer program code configured to, with the at least one processor, further cause the apparatus to perform one or more of the following:

ignore each detected touch in the queue;

ignore all but the newest detected touch in the queue;

trigger the touch event of one or more detected touches in the queue which are not ignored.

In some embodiments of the apparatus the step of ignoring a detected touch causes the apparatus to use one of the following models to determine the probability:

Hidden Markov Model;

Conditional Random Fields.

In some embodiments of the apparatus said at least one memory and computer program code configured to, with the at least one processor, cause the apparatus to:

send the touch event to an application for processing.

According to a third example there is provided a computer program product including one or more sequences of one or more instructions which, when executed by one or more processors, cause an apparatus to at least perform the following:

form proximity data indicative of existence of one or more pointing objects in proximity of a sensing panel;

determine from the proximity data whether at least one of the pointing objects touches the sensing panel;

if the determining indicates at least one touch of at least one pointing object, to determine a probability that movement of one or more of the pointing objects in proximity of the sensing panel illustrates a predetermined gesture;

compare the probability to a predetermined threshold; and trigger a touch event, if the probability is less than the predetermined threshold.

In some embodiments the computer program product includes one or more sequences of one or more instructions which, when executed by one or more processors, cause an apparatus to at least perform the following:

receive one or more signals from the sensing panel;

convert said one or more signals to a first coordinate value, a second coordinate value and a proximity value representing said proximity data;

store the first coordinate value, the second coordinate value and the proximity value; and form one or more data tables from the proximity data.

In some embodiments the computer program product includes one or more sequences of one or more instructions which, when executed by one or more processors, cause an apparatus to at least perform the following:

examine if the location indicated by the coordinates is excluded from swiping operation, if the proximity value indicates that the pointing object touches the sensing panel; and trigger a touch event if the location indicated by the coordinates is excluded from swiping operation.

In some embodiments the computer program product includes one or more sequences of one or more instructions which, when executed by one or more processors, cause an apparatus to at least perform the following:

store data of a multiple of detected touches in a queue, wherein said at least one memory and computer program code configured to, with the at least one processor, further cause the apparatus to perform one or more of the following:

ignore each detected touch in the queue;

ignore all but the newest detected touch in the queue;

triggering the touch event of one or more detected touches in the queue which are not ignored.

In some embodiments of the computer program product the step of ignoring a detected touch causes an apparatus to at least use one of the following models to determine the probability:

Hidden Markov Model;

Conditional Random Fields.

In some embodiments the computer program product includes one or more sequences of one or more instructions which, when executed by one or more processors, cause an apparatus to at least perform the following:

send the touch event to an application for processing.

According to a fourth example there is provided an apparatus comprising:

a sensing panel to form proximity data indicative of existence of one or more pointing objects in proximity of the sensing panel;

a determining element to determine from the proximity data whether at least one of the pointing objects touches the sensing panel;

an analyzing element adapted to determine a probability that movement of one or more of the pointing objects in proximity of the sensing panel illustrates a predetermined gesture, if the determining indicates at least one touch of at least one pointing object; wherein the analyzing element is further adapted to:

compare the probability to a predetermined threshold; and trigger a touch event, if the probability is less than the predetermined threshold.

The invention claimed is:

1. A method comprising:

forming proximity data indicative of existence of one or more pointing objects in proximity of, but not touching, a sensing panel;

determining that one of the one or more pointing objects that was formerly in proximity of but not touching the sensing panel has touched the sensing panel;

in response to determining that one of the pointing objects that was formerly in proximity of but not touching the sensing panel has touched the sensing panel, determining a first probability that movement of the one or more of the pointing objects is indicative of a predetermined non-touching gesture;

comparing the first probability to a predetermined threshold;

in response to the first probability having a first relationship relative to the predetermined threshold, for a predetermined period of time after the one or more pointing objects that was formerly in proximity of but not touching the sensing panel having touched the sensing panel, determining a revised probability that movement of the one or more of the pointing objects is indicative of a predetermined non-touching gesture;

triggering a gesture event related to the predetermined non-touching gesture in response to the revised probability increasing relative to the first probability; and triggering a touch event related to the one or more pointing objects that was formerly in proximity of but not touching the sensing panel having touched the sensing panel in response to the revised probability decreasing relative to the first probability.

2. The method according to claim 1, wherein forming proximity data for each of the one or more pointing objects comprises:

receiving one or more signals from the sensing panel;

converting said one or more signals to a first coordinate value, a second coordinate value and a proximity state representing said proximity data; and storing the first coordinate value, the second coordinate value and the proximity state.

3. The method according to claim 1 comprising collecting proximity data from multiple time instants, wherein the proximity data comprises one or more data tables including coordinates on the sensing panel and proximity states regarding the coordinates.

4. The method according to claim 1, wherein the proximity data comprises a proximity state for each of the one or more pointing objects, wherein the one or more pointing objects comprises at least two pointing objects, and wherein the proximity data includes:

data representing at least one first pointing object having a proximity state indicating a touch of the sensing panel at a first coordinate location; and data representing at least one second pointing object having a proximity state indicating that the pointing object is not touching the sensing panel but is in the proximity of a second coordinate location.

5. The method according to claim 4 comprising:

determining that the location indicated by the first coordinate location is excluded from swiping operation in response to the proximity state indicating that the pointing object touches the sensing panel; and triggering the touch event in response to the location indicated by the first coordinate location being excluded from swiping operation.

6. The method according to claim 1 further comprising:

storing data of a multiple of detected touches in a queue, wherein the method further comprises one or more of the following:

ignoring each detected touch in the queue;

ignoring all but the most recent detected touch in the queue;

triggering a touch event for each of one or more detected touches in the queue.

7. The method according to claim 1 comprising using one of the following models to determine the probability:

Hidden Markov Model; or

Conditional Random Fields.

8. The method according to claim 1 comprising:

sending the touch event to an application for processing.

9. The method according to claim 6 further comprising:

triggering the touch event related to the most recent detected touch from the queue in response to ignoring all but the most recent touch in the queue.

10. An apparatus comprising at least one processor and at least one memory including computer program code, the at least one memory and the computer program code configured to, with the at least one processor, cause the apparatus to:

form proximity data indicative of existence of one or more pointing objects in proximity of, but not touching, a sensing panel;

determine that one of the one or more pointing objects that was formerly in proximity of but not touching the sensing panel has touched the sensing panel;

in response to determining that one of the pointing objects that was formerly in proximity of but not touching the sensing panel has touched the sensing panel, determine a first probability that movement of one or more of the pointing objects is indicative of a predetermined non-touching gesture;

compare the first probability to a predetermined threshold;

in response to the first probability having a first relationship relative to the predetermined threshold, for a predetermined period of time after the one or more pointing objects that was formerly in proximity of but not touching the sensing panel having touched the sensing panel, determine a revised probability that movement of the one or more of the pointing objects is indicative of a predetermined non-touching gesture;

trigger a gesture event related to the predetermined non-touching gesture in response to the revised probability increasing relative to the first probability; and trigger a touch event related to the one or more pointing objects that was formerly in proximity of but not touching the sensing panel having touched the sensing panel in response to the revised probability decreasing relative to the first probability.

11. The apparatus according to claim 10, said at least one memory and computer program code configured to, with the at least one processor, cause the apparatus to:

receive signals from the sensing panel representative of proximity data;

convert said signals to a set of first coordinate values, second coordinate values and proximity states representing said proximity data for each of the one or more pointing objects; and store the first coordinate values, the second coordinate values and the proximity states; and form one or more data tables from the proximity data.

12. The apparatus according to claim 11, said at least one memory and computer program code configured to, with the at least one processor, cause the apparatus to:

determine that the location indicated by the first coordinate values is excluded from swiping operation in response to the proximity state associated with the first coordinate values indicating that the pointing object has touched the sensing panel; and trigger a touch event in response to the location indicated by the first coordinate values being excluded from swiping operation.

13. The apparatus according to claim 10, said at least one memory and computer program code configured to, with the at least one processor, cause the apparatus to:
store data of a multiple of detected touches in a queue, wherein said at least one memory and computer program code configured to, with the at least one processor, further cause the apparatus to perform one or more of the following:
ignore each detected touch in the queue;
ignore all but the most recent detected touch in the queue;
trigger a touch event for each of one or more detected touches in the queue which are not ignored.

14. The apparatus according to claim 13, wherein causing the apparatus to ignore each detected touch or all but the newest detected touch causes the apparatus to use one of the following models to determine the probability:
Hidden Markov Model; or
Conditional Random Fields.

15. The apparatus according to claim 10, said at least one memory and computer program code configured to, with the at least one processor, cause the apparatus to:
send the touch event to an application for processing.

16. A computer program product comprising at least one non-transitory computer-readable storage medium having computer-executable program code instructions stored therein, the computer-executable program code instructions comprising program code instructions which, when executed by one or more processors, cause an apparatus to at least perform the following:
form proximity data indicative of existence of one or more pointing objects in proximity of, but not touching, a sensing panel;
determine that one of the one or more pointing objects that was formerly in proximity of but not touching the sensing panel has touched the sensing panel;
in response to determining that one of the pointing objects that was formerly in proximity of but not touching the sensing panel has touched the sensing panel, determine a first probability that movement of one or more of the pointing objects is indicative of a predetermined non-touching gesture;
compare the first probability to a predetermined threshold;
in response to the first probability having a first relationship relative to the predetermined threshold, for a predetermined period of time after the one or more pointing objects that was formerly in proximity of but not touching the sensing panel having touched the sensing panel, determine a revised probability that movement of the one or more of the pointing objects is indicative of a predetermined non-touching gesture;
trigger a gesture event related to the predetermined non-touching gesture in response to the revised probability increasing relative to the first probability; and
trigger a touch event related to the one or more pointing objects that was formerly in proximity of but not touching the sensing panel having touched the sensing panel in response to the revised probability decreasing relative to the first probability.

17. The computer program product according to claim 16 including one or more sequences of one or more instructions which, when executed by one or more processors, cause an apparatus to at least perform the following:
receive one or more signals from the sensing panel representative of proximity data;
convert said one or more signals to a first coordinate value, a second coordinate value and a proximity state representing said proximity data for each of the one or more pointing objects;
store the first coordinate value, the second coordinate value and the proximity state; and
form one or more data tables from the proximity data.

18. The computer program product according to claim 17 including one or more sequences of one or more instructions which, when executed by one or more processors, cause an apparatus to at least perform the following:
determine that the location indicated by the first coordinate values is excluded from swiping operation in response to the proximity state associated with the first coordinate values indicating that the pointing object has touched the sensing panel; and
trigger a touch event in response to the location indicated by the first coordinate values being excluded from swiping operation.

19. The computer program product according to claim 16 including one or more sequences of one or more instructions which, when executed by one or more processors, cause an apparatus to at least perform the following:
store data of a multiple of detected touches in a queue, wherein said at least one memory and computer program code configured to, with the at least one processor, further cause the apparatus to perform one or more of the following:
ignore each detected touch in the queue;
ignore all but the most recent detected touch in the queue;
triggering a touch event for each of one or more detected touches in the queue which are not ignored.

20. The computer program product according to claim 19, wherein causing the apparatus to ignore each detected touch or all but the newest detected touch causes an apparatus to at least use one of the following models to determine the probability:
Hidden Markov Model; or
Conditional Random Fields.

21. The computer program product according to claim 16 including one or more sequences of one or more instructions which, when executed by one or more processors, cause an apparatus to at least perform the following:
send the touch event to an application for processing.

22. An apparatus comprising:
a sensing panel to form proximity data indicative of existence of one or more pointing objects in proximity of, but not touching, the sensing panel;
a determining element to determine that one of the at least one pointing objects that was formerly in proximity of but not touching the sensing panel has touched the sensing panel;
an analyzing element adapted to determine a first probability that movement of one or more of the one or more pointing objects is indicative of a predetermined non-touching gesture in response to determining that one of the pointing objects that was formerly in proximity of but not touching the sensing panel has touched the sensing panel; wherein the analyzing element is further adapted to:
compare the first probability to a predetermined threshold;
in response to the first probability being less than the predetermined threshold, for a predetermined period of time after the one or more pointing objects that was formerly in proximity of but not touching the sensing panel having touched the sensing panel, determine a revised probability that movement of the one or more of the pointing objects is indicative of a predetermined non-touching gesture;

trigger a gesture event related to the predetermined non-touching gesture in response to the revised probability increasing relative to the first probability; and trigger a touch event related to the one or more pointing objects that was formerly in proximity of but not touching the sensing panel having touched the sensing panel in response to the revised probability decreasing relative to the first probability.

\* \* \* \* \*